US012664721B2

(12) United States Patent
Kallio et al.

(10) Patent No.: US 12,664,721 B2
(45) Date of Patent: Jun. 23, 2026

(54) BINNING PASS WITH HIERARCHICAL DEPTH DATA DETERMINATION

(71) Applicant: ADVANCED MICRO DEVICES, INC., Santa Clara, CA (US)

(72) Inventors: Kiia K. Kallio, Inkoo (FI); Miikka Kangasluoma, Noormakuu (FI); Jan Achrenius, Noormakuu (FI)

(73) Assignee: Advanced Micro Devices, Inc., Santa Clara, CA (US)

( * ) Notice: Subject to any disclaimer, the term of this patent is extended or adjusted under 35 U.S.C. 154(b) by 389 days.

(21) Appl. No.: 17/851,611

(22) Filed: Jun. 28, 2022

(65) Prior Publication Data

US 2023/0419597 A1     Dec. 28, 2023

(51) Int. Cl.
*G06T 15/40* (2011.01)
*G06T 15/30* (2011.01)

(52) U.S. Cl.
CPC ............ *G06T 15/405* (2013.01); *G06T 15/30* (2013.01); *G06T 2210/12* (2013.01)

(58) Field of Classification Search
CPC .... G06T 15/405; G06T 15/30; G06T 2210/12
See application file for complete search history.

(56) References Cited

U.S. PATENT DOCUMENTS

| | | | |
|---|---|---|---|
| 6,362,818 | B1 | 3/2002 | Gardiner et al. |
| 9,684,995 | B2 | 6/2017 | Yang |
| 9,865,085 | B1 | 1/2018 | Eng et al. |
| 9,934,548 | B2 | 4/2018 | Smith |
| 10,497,085 | B2 | 12/2019 | Lee et al. |
| 10,839,595 | B2 | 11/2020 | Ranganathan et al. |
| 11,361,400 | B1 | 6/2022 | Kholl et al. |
| 11,532,115 | B2 | 12/2022 | Yang et al. |
| 11,610,358 | B2 | 3/2023 | Jesus et al. |
| 11,861,782 | B2 | 1/2024 | Yang et al. |
| 11,922,555 | B2 | 3/2024 | Jesus et al. |
| 11,928,776 | B2 | 3/2024 | Howson |

(Continued)

FOREIGN PATENT DOCUMENTS

| | | |
|---|---|---|
| GB | 2591802 | 11/2021 |
| JP | 7100427 | 7/2022 |

OTHER PUBLICATIONS

U.S. Appl. No. 17/565,394, filed Dec. 29, 2021, Entitled "Synchronization Free Cross Pass Binning Through Subpass Interleaving", 35 pages.

(Continued)

*Primary Examiner* — Kee M Tung
*Assistant Examiner* — Khoa Vu

(57) ABSTRACT

Currently with performing a visibility pass for two or more coarse bins of an image, a processing system determines a bounding box for a primitive to be rendered for the image based on a bottom left-most point of the primitive and a top right-most point of the primitive. The processing system then determines whether each tile of the image inside the boundary box is completely covered by the primitive. In response to the primitive not completely covering a tile, the depth data for the primitive in that tile is discarded. In response to the primitive completely covering a tile, the depth data for the primitive in that tile is passed on to a depth buffer. Based on the depth data passed to the depth buffer, the processing system then performs pixel-based rendering of the primitive.

17 Claims, 8 Drawing Sheets

(56) References Cited

U.S. PATENT DOCUMENTS

| | | | |
|---|---|---|---|
| 11,988,523 | B2 | 5/2024 | Bhowmick et al. |
| 2007/0139440 | A1 | 6/2007 | Crow et al. |
| 2011/0221743 | A1 | 9/2011 | Keall et al. |
| 2014/0043342 | A1 | 2/2014 | Goel et al. |
| 2014/0267375 | A1 | 9/2014 | Kilgard et al. |
| 2015/0363968 | A1 | 12/2015 | Yang et al. |
| 2015/0363969 | A1 | 12/2015 | Yang |
| 2016/0098856 | A1 | 4/2016 | Broadhurst et al. |
| 2016/0364901 | A1* | 12/2016 | Balci ...................... G06T 15/005 |
| 2017/0024927 | A1 | 1/2017 | Isomaki et al. |
| 2017/0270146 | A1 | 9/2017 | Harrison et al. |
| 2018/0089890 | A1 | 3/2018 | Shreiner |
| 2018/0307490 | A1* | 10/2018 | Hakura ............... G06F 12/0808 |
| 2018/0365885 | A1 | 12/2018 | Yang |
| 2020/0184715 | A1 | 6/2020 | Goswami et al. |
| 2020/0250882 | A1 | 8/2020 | Yang et al. |
| 2020/0380745 | A1 | 12/2020 | Bhiravabhatla et al. |
| 2021/0174575 | A1 | 6/2021 | Mandal et al. |
| 2021/0225060 | A1 | 7/2021 | Tuomi et al. |
| 2022/0036629 | A1 | 2/2022 | Tuomi et al. |
| 2022/0092801 | A1 | 3/2022 | Achrenius et al. |
| 2022/0101479 | A1* | 3/2022 | Alla ......................... G06T 11/40 |
| 2022/0198745 | A1* | 6/2022 | Yang ......................... G06T 7/13 |
| 2022/0392138 | A1* | 12/2022 | Kokins ..................... G06T 1/60 |
| 2023/0298249 | A1 | 9/2023 | Shao et al. |
| 2024/0005601 | A1 | 1/2024 | Kallio et al. |
| 2024/0112397 | A1 | 4/2024 | Brennan et al. |

OTHER PUBLICATIONS

U.S. Appl. No. 17/853,136, filed Jun. 29, 2022, Entitled "Hierarchical Depth Data Generation Using Primitive Fusion" 61 pages.
U.S. Appl. No. 17/855,268, filed Jun. 30, 2022, Entitled "Pipeline Delay Reduction for Coarse Visibility Compression" 40 pages.
Office Action issued in U.S. Appl. No. 17/853,136, mailed Apr. 5, 2024, 18 pages.
Office Action issued in U.S. Appl. No. 17/853,136, mailed Oct. 11, 2024, 22 pages.

* cited by examiner

BINNING PASS WITH HIERARCHICAL DEPTH DATA DETERMINATION

BACKGROUND

In a graphics processing system, three-dimensional scenes are rendered by accelerated processing units for display on two-dimensional displays. To render such scenes, the graphics processing system receives a command stream from an application indicating various primitives to be rendered for the scene. The graphics processing system then renders these primitives according to a graphics pipeline that has different stages each including instructions to be performed by the graphics processing system. The graphics processing system then displays the rendered primitives as part of a three-dimensional scene displayed in a two-dimensional display.

To help reduce the time needed to render primitives for a scene, the graphics processing system divides the scene into multiple tiles and renders the scene by tile. Further, the graphics processing system performs tile-based rendering for the primitives in a tile before performing pixel-based rendering of the primitives. However, performing pixel-based rendering of the primitives requires generating depth values for the primitives to be generated. Generating such depth values is time-consuming, increasing the total time needed to render the primitives and decreasing the efficiency of the graphics processing system.

BRIEF DESCRIPTION OF THE DRAWINGS

The present disclosure may be better understood, and its numerous features and advantages are made apparent to those skilled in the art by referencing the accompanying drawings. The use of the same reference symbols in different drawings indicates similar or identical items.

DETAILED DESCRIPTION

Figure 1:
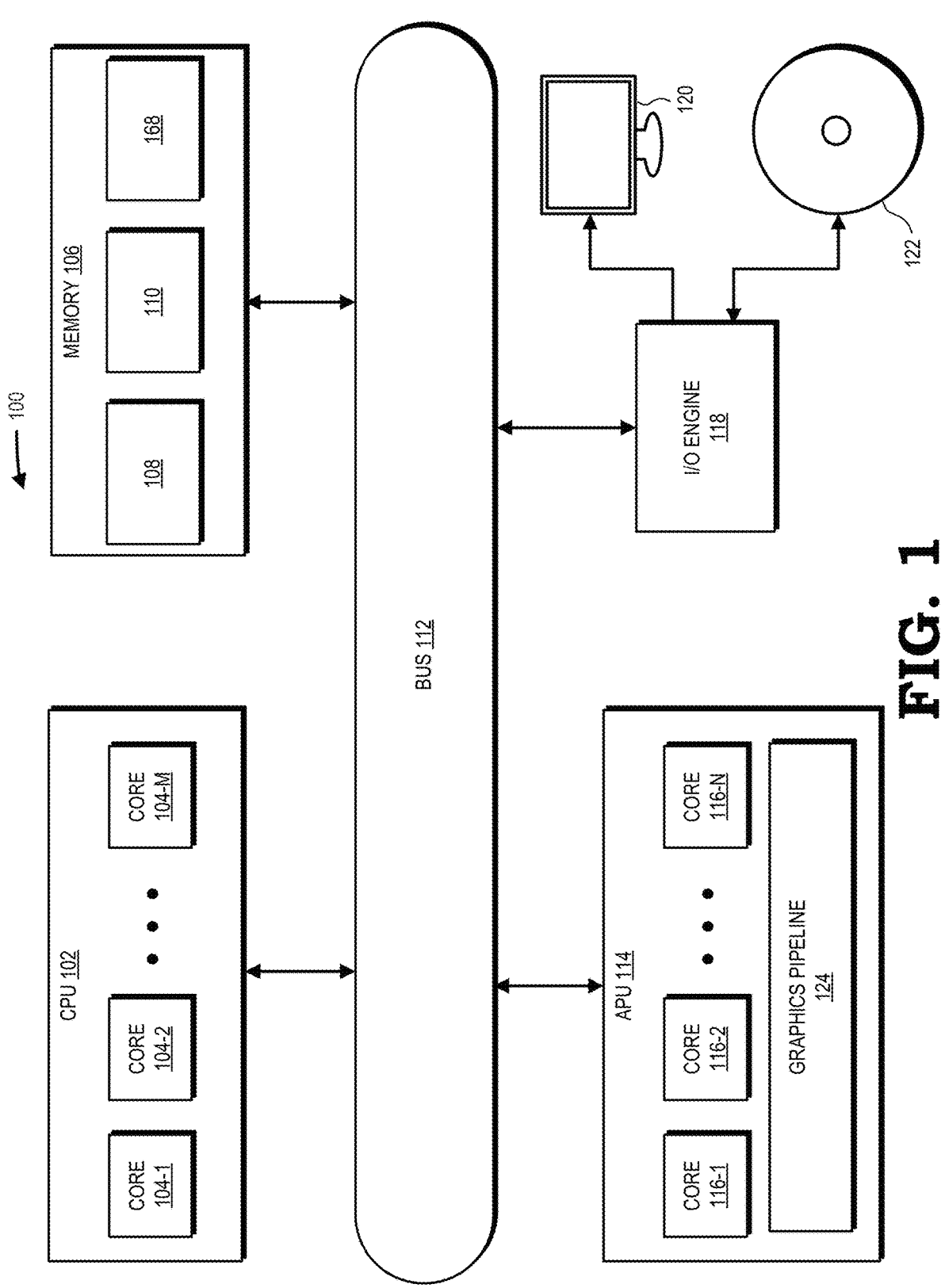
FIG. 1 is a block diagram of a processing system configured to prime a depth buffer using hierarchical depth data, in accordance with some embodiments.

To help reduce the time needed for a processing system to render primitives of an image, a processing system performs coarse visibility compression by first generating and compressing visibility data for each visible primitive of the image and then using the compressed visibility data to render the primitives. To this end, the processing system (e.g., accelerated processing unit (APU), central processing unit (CPU), memory) first divides the image into two or more bins (e.g., coarse bin) The processing system then performs a visibility pass for the image by determining whether each primitive of the image is visible (e.g., present) in each bin. In response to a primitive not being visible in a bin, the processing system generates visibility data indicating that the primitive is not visible in the bin, a draw call associated with the primitive is not visible in the bin, or both and the primitive, the draw call, or both should not be rendered for the bin. In response to a primitive being visible in the bin, the processing system generates visibility data indicating, for example, vertex data, shading data, positioning data, or any combination thereof, of the primitive. Once visibility data is generated by the processing system, the processing system compresses the visibility data and stores the compressed visibility data in a buffer associated with one or more the bins (e.g., coarse bins). The processing system next flushes the compressed visibility data from the buffer, for example, in response to the visibility pass for the image being completed (e.g., the processing system has determined whether each primitive is or is not visible in bins of the image) and stores the flushed visibility data in a memory. The processing system then uses the flushed visibility data to perform tile-based rendering for the primitives in the bins of the image. By using the compressed visibility data, the time to perform tile-based rendering on the primitives is reduced.

After tile-based rendering is performed for a primitive, the processing system performs pixel-based rendering for the primitive. To this end, techniques and systems described herein address reducing the time needed to perform pixel-based rendering. To reduce the time needed for pixel-based rendering, the processing system (e.g., APU, CPU) divides the image into two or more bins (e.g., coarse bins) and determines hierarchical depth data for the primitives of the image concurrently or within the visibility pass. The processing system then primes a depth buffer using the determined hierarchical depth data. The hierarchical depth data includes, for example, depth data for a primitive at a tile level (e.g., the depth of the primitive at one or more pixels of the tile, an average depth of the primitive in the tile, or both). Each bin (e.g., coarse bin), for example, includes a number of tiles in a first direction and a second number of tiles in a second direction and each tile, for example, includes a third number of pixels in the first direction and a fourth number of pixels in a second direction. To determine such hierarchical depth data for a primitive, the processing system first determines a bounding box for the primitive based on, for example, a bottom left-most point of the primitive and a top right-most point of the primitive. The processing system then rounds the bounding box by, as an example, rounding the bottom left-most point of the primitive to a next highest tile boundary and the top right-most point of the primitive to a next lowest tile boundary. After generating the rounded boundary box, the processing system determines whether each tile inside the boundary box is substantially covered by the primitive. That is to say, for each tile within the boundary box, the processing system determines whether the primitive is visible (e.g., present) in at least a predetermined threshold percentage of the tile (e.g., the primitive is visible in the entirety of the tile). In response to the primitive not substantially covering a tile (e.g., the primitive is visible in less than a predetermined threshold percentage of the tile), the depth data for the primitive in that tile is discarded. In response to the primitive completely covering a tile (e.g., the primitive is visible in equal to or more than a predetermined threshold percentage of the tile), the hierarchical depth data (e.g., depth data at a tile level) for the primitive in that tile is passed on to a depth buffer. Once in the depth buffer, the hierarchical depth data is made available for pixel-based rendering of the primitive. In this way, the time needed to perform pixel-based rendering of the primitive is reduced as at least a portion of the depth data needed to perform pixel-based rendering is already available in the depth buffer.

While embodiments disclosed herein are discussed in the context of generating and using compressed visibility data to render one or more primitives of one or more draw calls at the frontend of a graphics pipeline, in other embodiments, the techniques and systems described herein are employed with using other data (e.g., original index data) to render one or more primitives at the frontend of a graphics pipeline.

FIG. 1 is a block diagram of a processing system 100 configured to prime a depth buffer using hierarchical depth data, according to some implementations. The processing system 100 includes or has access to a memory 106 or other storage component implemented using a non-transitory computer-readable medium, for example, a dynamic random-access memory (DRAM). However, in implementations, the memory 106 is implemented using other types of memory including, for example, static random-access memory (SRAM), nonvolatile RAM, and the like. According to implementations, the memory 106 includes an external memory implemented external to the processing units implemented in the processing system 100. The processing system 100 also includes a bus 112 to support communication between entities implemented in the processing system 100, such as the memory 106. Some implementations of the processing system 100 include other buses, bridges, switches, routers, and the like, which are not shown in FIG. 1 in the interest of clarity.

The techniques described herein are, in different implementations, employed at accelerated processing unit (APU) 114. APU 114 includes, for example, vector processors, coprocessors, graphics processing units (GPUs), general-purpose GPUs (GPGPUs), non-scalar processors, highly parallel processors, artificial intelligence (AI) processors, inference engines, machine learning processors, other multithreaded processing units, scalar processors, serial processors, or any combination thereof. The APU 114 renders images according to one or more applications 110 for presentation on a display 120. For example, the APU 114 renders objects (e.g., textures) to produce values of pixels that are provided to the display 120, which uses the pixel values to display an image that represents the rendered objects. To render the objects, the APU 114 implements a plurality of processor cores 116-1 to 116-N that execute instructions concurrently or in parallel. For example, the APU 114 executes instructions from a graphics pipeline 124 using a plurality of processor cores 116 to render one or more textures. According to implementations, one or more processor cores 116 operate as SIMD units that perform the same operation on different data sets. Though in the example implementation illustrated in FIG. 1, three cores (116-1, 116-2, 116-N) are presented representing an N number of cores, the number of processor cores 116 implemented in the APU 114 is a matter of design choice. As such, in other implementations, the APU 114 can include any number of cores 116. Some implementations of the APU 114 are used for general-purpose computing. The APU 114 executes instructions such as program code 108 for one or more applications 110 stored in the memory 106 and the APU 114 stores information in the memory 106 such as the results of the executed instructions.

The processing system 100 also includes a central processing unit (CPU) 102 that is connected to the bus 112 and therefore communicates with the APU 114 and the memory 106 via the bus 112. The CPU 102 implements a plurality of processor cores 104-1 to 104-N that execute instructions concurrently or in parallel. In implementations, one or more of the processor cores 104 operate as SIMD units that perform the same operation on different data sets. Though in the example implementation illustrated in FIG. 1, three cores (104-1, 104-2, 104-M) are presented representing an M number of cores, the number of processor cores 104 implemented in the CPU 102 is a matter of design choice. As such, in other implementations, the CPU 102 can include any number of cores 104. In some implementations, the CPU 102 and APU 114 have an equal number of cores 104, 116 while in other implementations, the CPU 102 and APU 114 have a different number of cores 104, 116. The processor cores 104 execute instructions such as program code 108 for one or more applications 110 stored in the memory 106 and the CPU 102 stores information in the memory 106 such as the results of the executed instructions. The CPU 102 is also able to initiate graphics processing by issuing draw calls to the APU 114. In implementations, the CPU 102 implements multiple processor cores (not shown in FIG. 1 in the interest of clarity) that execute instructions concurrently or in parallel.

In embodiments, the APU 114 is configured to render one or more objects (e.g., textures) for an image to be rendered according to a graphics pipeline 124. A graphics pipeline 124 includes, for example, one or more steps, stages, or instructions to be performed by APU 114 in order to render one or more objects for an image to be rendered. For example, a graphics pipeline 124 includes data indicating an assembler stage, vertex shader stage, hull shader stage, tessellator stage, domain shader stage, geometry shader stage, binner stage, hierarchical-z stage, rasterizer stage, pixel shader stage, and output merger stage to be performed by APU 114 in order to render one or more textures. According to embodiments, graphics pipeline 124 has a frontend that includes one or more stages of graphics pipeline 124 and a backend including one or more other stages of graphics pipeline 124. As an example, graphics pipeline 124 has a frontend including one or more stages associated with tile-based (e.g., bin-based) rendering (e.g., assembler stage, vertex shader stage, hull shader stage, tessellator stage, domain shader stage, geometry shader stage, binner stage, hierarchical-z stage) and a backend including one or more stages associated with pixel-based rendering (e.g., rasterizer stage, pixel shader stage, output merger stage). In embodiments, APU 114 is configured to perform at least a portion of the frontend of graphics pipeline 124 concurrently with at least a portion of the backend of graphics pipeline 124. For example, APU 114 is configured to perform one or more stages of a frontend of graphics pipeline 124 associated with tile-based rendering currently with one or more stages of a backend of graphics pipeline 124 associated with pixel-based rendering.

To render one or more objects, APU 114 uses original index data 168 when executing at least a portion of graphics pipeline 124. For example, APU 114 uses original index data 168 when executing the frontend of graphics pipeline 124 that includes stages associated with tile-based rendering. Original index data 168 includes, for example, data representing vertices of one or more primitives of an object (e.g., texture) to be rendered by APU 114. In embodiments, APU 114 is configured to use original index data 168 to assemble, position, shade, or any combination thereof, one or more primitives according to graphics pipeline 124. To help increase the performance of the frontend of graphics pipeline 124, processing system 100 compresses index data before it is used by APU 114 to assemble, position, or shade one or more primitives. As an example, before APU 114 is configured to execute at least a portion of graphics pipeline 124, APU 114 is configured to perform a visibility pass to compress index data. A visibility pass includes, for example, first dividing an image to be rendered into one or more bins (e.g., coarse bins). Each bin, for example, includes a first number of pixels of the image to be rendered in a first direction (e.g., horizontal direction) and a second number of pixels of the image to be rendered in a second (e.g., vertical direction). After the image is divided into bins, the visibility pass includes APU 114 determining a number of primitives to be rendered. For example, APU 114 determines a number of primitives to be rendered based on a batch of draw calls indicated in a command stream received by an application 110. For each primitive determined from the command stream, APU 114 performs one or more stages of the frontend of graphics pipeline 124. As an example, APU 114 performs an assembler stage and one or more shader stages for a primitive determined from a command stream. After one or more stages of the frontend of graphics pipeline 124 are performed for one or more primitives determined from the command stream, APU 114 then determines if each primitive is present (e.g., visible) in each bin (e.g., coarse bin) of the image and provides visibility data for each visible primitive to a respective memory (e.g., a buffer). For example, in response to determining that at least a portion of a primitive is present (e.g., visible) in a first bine, APU 114 provides visibility data indicating vertex data, associated draw call data, number of primitives visible in an associated draw call, shading data, positioning data, or any combination thereof, of the primitive to a respective buffer (e.g., a buffer associated with the first bin). Additionally, in response to determining that no primitive of a draw call is present (e.g., visible) in the first bin, APU 114 provides visibility data indicating the draw call is not present (e.g., visible) in the first bin and no primitives of the draw call are to be rendered in the first bin.

According to embodiments, CPU 102, APU 114, or both are configured to compress visibility data before it is stored in a respective buffer. For example, CPU 102, APU 114, or both are configured to compress data relating to the vertices (e.g., positioning data, shading data) of a primitive visible in a bin before the data relating to the vertices is stored in a buffer. In embodiments, CPU 102, APU 114, or both are configured to flush visibility data out of a buffer in response to a threshold event. Such threshold events include, for example, a predetermined period of time (e.g., nanoseconds, milliseconds, seconds, minutes) elapsing, APU 114 completing a visibility pass for the image, or both. CPU 102, APU 114, or both flush visibility data out of a buffer into memory 106, for example, such that the flushed visibility data is available as compressed index data for the frontend of graphics pipeline 124. That is to say, APU 114 is configured to use visibility data flushed from a buffer into memory 106 as compressed index data instead of original index data 168 when performing one or more stages of graphics pipeline 124. After APU 114 has completed the visibility pass for the image and visibility data has been flushed from one or more buffers, APU 114 is configured to render primitives in each bin (e.g., coarse bin) using the compressed index data (e.g., flushed visibility data) and according to graphics pipeline 124. As an example, after completing the visibility pass for the image and flushing the buffers of visibility data, APU 114 renders primitives in a first bin to be rendered using compressed index data and according to the stages of graphics pipeline 124. Once all the primitives in the first bin are rendered, APU 114 renders primitives, for example, in a next coarse bin (e.g., second bin) using compressed index data and according to the stages of graphics pipeline 124. APU 114 renders primitives by bin (e.g., coarse bin) until the primitives in each bin are rendered.

In embodiments, APU 114 is further configured to help reduce the time needed to render primitives at the backend of graphics pipeline 124. That is to say, APU 114 is configured to help reduce the time needed to perform pixel-based rendering on primitives. To this end, APU 114 is configured to generate hierarchical depth data for an image concurrently with performing the visibility pass and to use the generated hierarchical depth data to prime a depth buffer (e.g., store the generated hierarchical depth data in the depth buffer so that it is available for pixel-based rendering of primitives). Hierarchical depth data includes, for example, data relating to the depth of a one or more primitives in one or more tiles of an image. That is to say, hierarchical depth data includes depth data for primitives at a tile-level. As an example, hierarchical depth data includes a flag indicating the primitive is valid in a tile, the depth of the primitive at one or more pixels of the tile, an average depth of the primitive in the tile, or any combination thereof. Each tile of the image includes, for example, a number of pixels of the image in a first direction and a second number of pixels of the image in a second direction. In embodiments, each bin of the image includes two or more tiles (e.g., a number of tiles in a first direction and a second number of tile in a second directions). To generate such hierarchical depth data, APU 114 first identifies one or more primitives for an image from a command stream received, for example, from an application 110. After APU 114 divides the image into one or more tiles, APU 114 then determines hierarchical depth data for one or more primitives identified in the command stream. For example, for a first primitive identified in the command stream, APU 114 generates a bounding box around the first primitive. APU 114 generates the bounding box by determining a first point on the primitive, for example, a bottom left-most point (e.g., minimum x, minimum y point) of the primitive, and a second point on the primitive, for example, a top right-most point (e.g., maximum x, maximum y point) of the primitive. In embodiments, after generating the bounding box for the primitive, APU 114 is configured to round the generated bounding box. For example, APU 114 is configured to round the bottom left-most point to a next highest tile boundary (e.g., next highest x tile boundary and next highest y tile boundary) and to round the top right-most point to a next lowest tile boundary (e.g., next lowest x tile boundary and next lowest y tile boundary). By rounding the boundary box in this way, APU 114 better compensates for any uncertainty in the area of the primitive.

According to embodiments, APU 114 next determines whether the generated boundary box, rounded boundary box, or both are invalid. For example, APU 114 determines whether the boundary box, rounded boundary box, or both have an area greater than zero. In response to a boundary box, rounded boundary box, or both having an area equal to or less than zero, APU 114 determines the boundary box to be invalid and culls the primitive associated with the boundary box from the hierarchical depth determination. After culling the primitive, APU 114 generates a new boundary box for another, different primitive identified in the command stream. In response to a boundary box, rounded boundary box, or both having an area greater than zero, the APU 114 continues determining hierarchical depth data for the primitive associated with the boundary box. In determining hierarchical depth data for the primitive, APU 114 next cuts each tile of the image not within the boundary box from the hierarchical depth determination. After cutting these tiles, APU 114 determines whether each tile within the boundary box is substantially covered by the primitive or not. As an example, for each tile within the boundary box where the primitive is visible (e.g., present), APU 114 determines whether the primitive substantially covers the tile (e.g., is present or visible in at least a percent threshold of the tile) or does not substantially cover the tile (e.g., is present or visible in less than a percent threshold of the tile). In response to the primitive not substantially covering a tile, APU 114 rejects the depth data for the primitive in that tile, and therefore, does not pass the depth data for the primitive in that tile on to the depth buffer. In response to the primitive substantially covering a tile, the depth data for the primitive in that tile is passed and stored in a depth buffer. After APU 114 has determined whether or not the primitively substantially covers each tile within the boundary box, APU 114 moves on to the next primitive identified in the command stream to generate hierarchical depth data. In this way, the depth buffer is primed with hierarchical depth data at a tile level of the primitives identified in the command stream. That is to say, depth data at a tile-level hierarchy of the primitives is stored in the depth buffer and made available for pixel-based rendering of the primitives. By priming the depth buffer with the generated hierarchical depth data, the time needed to render the primitives at the backend of graphics pipeline 124 is reduced, for example, as more primitives can be rejected by an early depth test against the primed depth buffer values.

An input/output (I/O) engine 118 includes hardware and software to handle input or output operations associated with the display 120, as well as other elements of the processing system 100 such as keyboards, mice, printers, external disks, and the like. The I/O engine 118 is coupled to the bus 112 so that the I/O engine 118 communicates with the memory 106, the APU 114, or the CPU 102. In the illustrated implementation, the I/O engine 118 reads information stored on an external storage component 122, which is implemented using a non-transitory computer-readable medium such as a compact disk (CD), a digital video disc (DVD), and the like. The I/O engine 118 is also able to write information to the external storage component 122, such as the results of processing by the APU 114 or the CPU 102.

Figure 2:
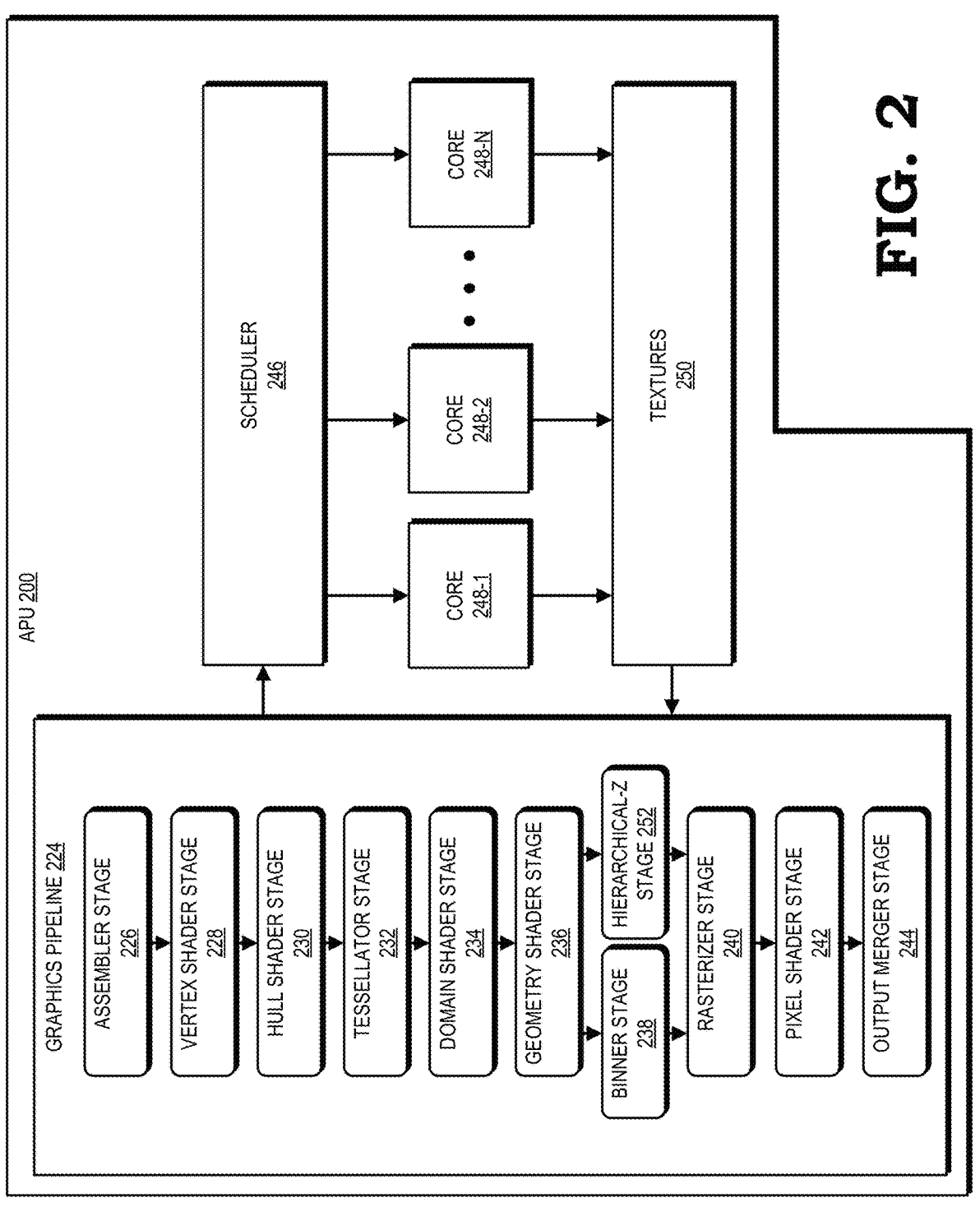
FIG. 2 is a block diagram of an accelerated processing unit configured to implement a graphics pipeline including hierarchical depth data generation, in accordance with some embodiments.

Referring now to FIG. 2, an APU 200 configured to implement a graphics pipeline including hierarchical depth data generation is presented. In embodiments, APU, 200 similar to or the same as APU 114, is configured to render one or more textures 250 based on command stream received from an application 110 and including data for an image to be rendered. For example, a command stream includes data indicating a batch of draw calls each identifying one or more primitives to be rendered for the image. To render the image indicated in the command stream, APU 200 is configured to render one or more primitives of a draw call according to graphics pipeline 224, similar to or the same as graphics pipeline 124. Graphics pipeline 224 includes one or more steps, stages, or instructions to be performed by APU 200 in order to render one or more objects for an image to be rendered, for example, assembler stage 226, vertex shader stage 228, hull shader stage 230, tessellator stage 232, domain shader stage 234, geometry shader stage 236, binner stage 238, hierarchical-z stage 252, rasterizer stage 240, pixel shader stage 242, output merger stage 244, or any combination thereof.

Assembler stage 226 includes, for example, data and instructions for APU 200 to read and organize primitive data from a memory (e.g., memory 106), application 110, command stream, or any combination thereof, into one or more primitives to be rendered by the rest of graphics pipeline 224. Vertex shader stage 228 includes, for example, data and instructions for APU 200 to perform one or more operations on the primitives generated by assembler stage 226. Such operations include, for example, transformations (e.g., coordinate transformations, modeling transformations, viewing transformations, projection transformations, viewpoint transformations), skinning, morphing, and lighting operations. Hull shader stage 230, tessellator stage 232, and domain shader stage 234 together include, for example, data and instructions for APU 200 to implement tessellation for the primitives modified by vertex shader stage 228. Geometry shader stage 236 includes, for example, data and instructions for APU 200 to perform vertex operations on the tessellated primitives. Such vertex operations include, for example, point sprint expansion, dynamic particle system operations, fur-fin generation, shadow volume generation, single pass render-to-cubemap, per-primitive material swapping, and per-primitive material setup. Binner stage 238 includes, for example, data and instructions for APU 200 to perform coarse rasterization to determine if a bin (e.g., coarse bin) of an image overlaps with one or more primitives (e.g., primitives modified by vertex shader stage 228). That is to say, binner stage 238 includes data and instructions for APU 200 to determine which primitives are present (e.g., visible) in a bin (e.g., coarse bin) of an image. Hierarchical-z stage 252 includes data and instructions for APU 200 to generate depth data for each primitive at a tile level (e.g., hierarchical depth data) and prime a depth buffer with the generated depth data. Rasterization stage 240 includes, for example, data and instructions for APU 200 to determine which pixels are included in each primitive and convert each primitive into pixels of the image. Pixel shader stage 242 includes, for example, data and instructions for APU 200 to determine the output values for the pixels determined during rasterization stage 240. Output merger stage 244 includes, for example, data and instructions for APU 200 to merge the output values of the pixels using, for example, z-testing and alpha blending.

According to embodiments, each instruction of a stage of graphics pipeline 224 is performed by one or more cores 248, similar to or the same as cores 116, of APU 200. Though the example embodiment illustrated in FIG. 2 presents APU 200 having three cores (248-1, 248-2, 248-N) representing an N number of cores, in other embodiments, APU 200 may have any number of cores. Each instruction of graphics pipeline 224 is scheduled for execution by one or more cores 248 by scheduler 246. Scheduler 246 includes, for example, hardware and software configured to schedule tasks and instructions for the cores 248 of APU 200. In this way, two or more stages of graphics pipeline 224 are performed concurrently. In embodiments, graphics pipeline 224 includes a frontend that includes one or more stages of graphics pipeline 224 and a backend that includes one or more other stages of graphics pipeline 224. For example, graphics pipeline 224 includes a frontend that includes stages relating to tile-based (e.g., coarse tile-based) rendering (e.g., assembler stage 226, vertex shader stage 228, hull shader stage 230, tessellator stage 232, domain shader stage 234, geometry shader stage 236, binner stage 238, hierarchical-z stage 252) and a backend that includes stages relating to pixel-based rendering (e.g., rasterization stage 240, pixel shader stage 242, output merger stage 244). In embodiments, APU 200 is configured to perform one or more stages of the frontend of graphics pipeline 224 concurrently with one or more stages of the backend of graphics pipeline 224.

Figure 3:
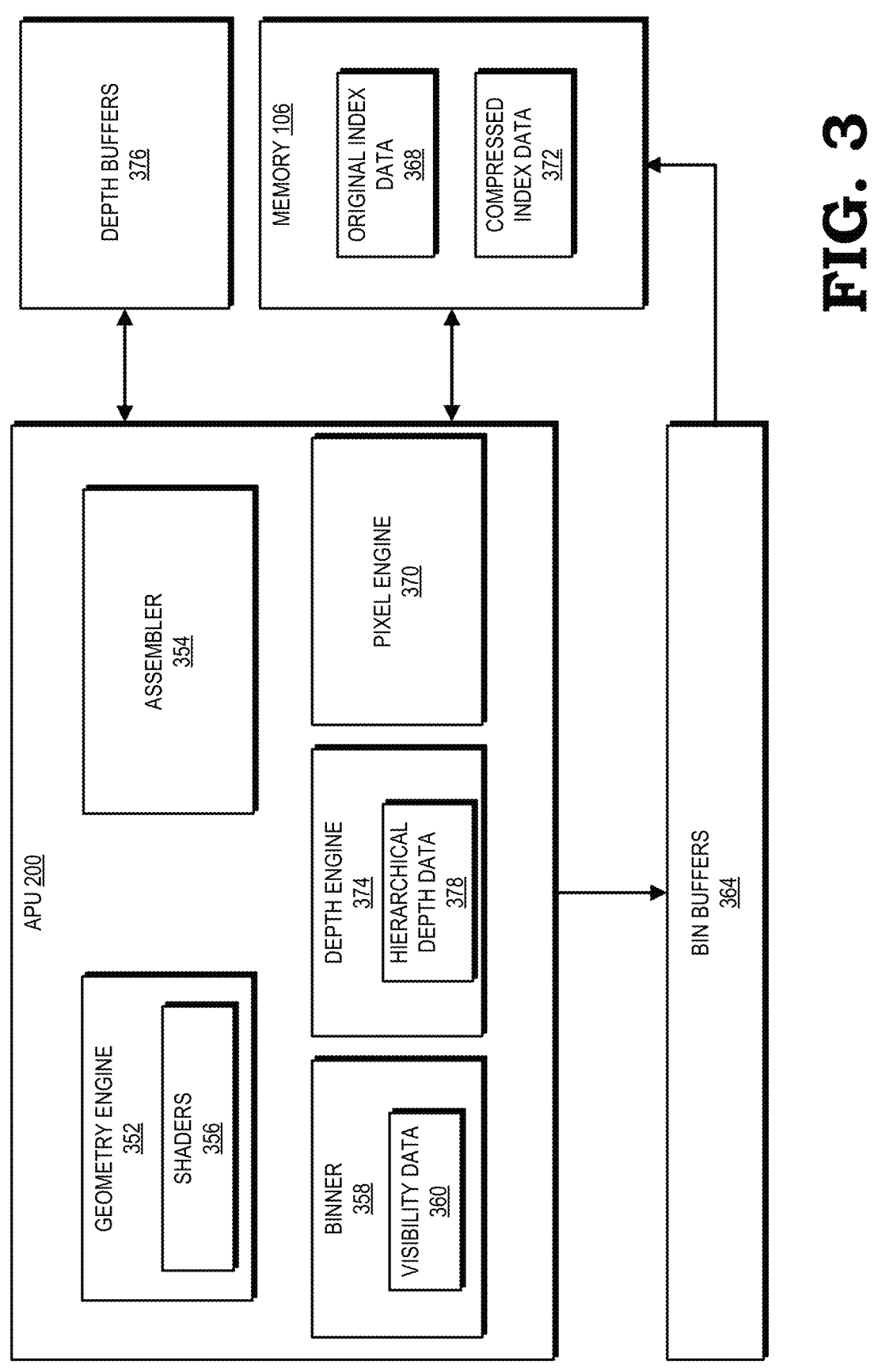
FIG. 3 is a block diagram of an accelerated processing unit configured prime a depth buffer using hierarchical depth data, in accordance with some embodiments.

Referring now to FIG. 3, APU 200 configured to prime a depth buffer using hierarchical depth data is presented. In embodiments, APU 200 is configured to generate one or more textures 250 according to graphics pipeline 224. To this end, APU 200 includes assembler 354, geometry engine 352, shaders 356, binner 358, and depth engine 374. Assembler 354 includes, for example, hardware and software-based circuitry configured to implement one or more instructions from, for example, assembler stage 226 of graphics pipeline 224. That is to say, assembler 354 includes hardware and software-based circuitry configured to read and organize primitive data from a memory (e.g., memory 106), application 110, command stream, or any combination thereof into one or more primitives to be rendered. In embodiments, assembler 354 includes hardware and software-based circuitry configured to read and organize data output by one or more stages of graphics pipeline 224 such that the data is usable by one or more other stages of graphics pipeline 224. For example, assembler 354 is configured to read and organize data output by geometry shader stage 236 such that the data is usable by binner stage 238. Geometry engine 352 includes hardware and software-based circuitry to implement one or more instructions from one or more stages of the frontend of graphics pipeline 224, for example, vertex shader stage 228, hull shader stage 230, tessellator stage 232, domain shader stage 234, and geometry shader stage 236. As an example, geometry engine 352 includes one or more hardware and software shaders 356 configured to implement one or more instructions from one or more stages of the frontend of graphics pipeline 224. Binner 358 includes hardware and software-based circuitry configured to perform a visibility pass for an image, one or more instructions from binner stage 238, or both. For example, binner 358 is configured to determine whether one or more primitives of one or more draw calls are visible in a coarse bin and to store visibility data 360 indicating, for example, vertex data, shading data, positioning data, associated draw call data (e.g., draw call identifier, number of primitives in the draw call) of the visible primitives in a respective bin buffer 364. Depth engine 374 includes hardware and software-based circuitry configured to determine hierarchical depth data (e.g., depth data at a tile-level) for one or more primitives, perform one or more instructions from hierarchical-z stage 252, or both. For example, depth engine 374 is configured to determine hierarchical depth data 378 (e.g., tile-level depth data) for one or more primitives substantially covering (e.g., completely covering) one or more tiles of the image and store hierarchical depth data 378 in one or more depth buffers 376. Pixel engine 370 includes hardware and software-based circuitry configured to implement one or more instructions from one or more stages of the backend of graphics pipeline 224, for example, rasterizer stage 240, pixel shader stage 242, and output merger stage 244.

According to embodiments, APU 200 is configured to concurrently perform one or more instructions associated with a frontend of graphics pipeline 224 and one or more instructions associated with a backend of graphics pipeline 224. For example, assembler 354, geometry engine 352, binner 358, or any combination thereof are configured to perform one or more tile-based rending instructions associated with a frontend of graphics pipeline 224 (e.g., assembler stage 226, vertex shader stage 228, hull shader stage 230, tessellator stage 232, domain shader stage 234, geometry shader stage 236, binner stage 238) for visible primitives in a bin and pixel engine 370 is configured to perform one or more pixel-based rendering instructions associated with a backend of graphics pipeline 224 (e.g., rasterizer stage 240, pixel shader stage 242, output merger stage 244) for pixels in the same or a different bin.

In embodiments, geometry engine 352 is configured to implement instructions from the frontend of graphics pipeline 224 using original index data 368 that includes, for example, data representing vertices of one or more primitives of a texture 250 to be rendered by APU 114 (e.g., pointers to a vertex buffer). To help reduce the amount of time needed for geometry engine 352 to implement instructions from the front end of graphics pipeline 224, APU 200 is configured to generate compressed index data 372 that includes, for example, compressed data representing vertices of one or more primitives of a texture 250 to be rendered by APU 200. To this end, APU 200 is configured to receive a command stream from application 110 that indicates an image to be rendered. For example, the command stream indicates a batch of draw calls identifying one or more primitives to be rendered for an image. In response to receiving the command stream, assembler 354, geometry engine 352, or both are configured to perform instructions for one or more stages of the frontend of graphics pipeline 224 to generate one or more primitives. For example, assembler 354 is configured to implement instructions from assembler stage 226 and geometry engine 352 is configured to implement instructions from vertex shader stage 228, hull shader stage 230, tessellator stage 232, domain shader stage 234, geometry shader stage 236, or any combination thereof to generate one or more primitives. Binner 358 is then configured to divide the image into one or more bins (e.g., coarse bins) and perform a visibility for the image (e.g., for the bins of the image). That is to say, binner 358 determines which of the primitives generated by assembler 354 and geometry engine 352 are visible (e.g., present) in each bin of the image. In embodiments, binner 358 is configured to generate visibility data for all bins in a screen area of the image during the visibility pass.

Binner 358 is configured to generate visibility data 360 associated with a bin and store the visibility data 360 in a respective bin buffer 364. For example, during the visibility pass, in response to determining that no primitives of a draw call are visible (e.g., present) in the first bin, binner 358 is configured to provide visibility data 360 (e.g., a flag) to a respective bin buffer 364 (e.g., a bin buffer 364 associated with the first tile) indicating that the draw call is not visible in the first bin and primitives of the draw call are not to be rendered for the first bin. Additionally, in response to determining a primitive is visible (e.g., present) in the first tile, binner 358 is configured to provide visibility data 360 to the respective bin buffer 364 indicating a draw call associated with the primitive is visible in the bin, draw call data (e.g., draw call identifier, number of visible primitives in the draw call), vertex data, shading data, positioning data, or any combination thereof associated with the primitive. According to embodiments, binner 358 is configured to compress visibility data 360 before is provided and stored in bin buffers 364. In embodiments, APU 200, CPU 102, or both are configured to flush compressed visibility data 360 from bin buffers 364 into memory 106 in response to a threshold event. Such threshold events include, for example, a predetermined period of time (e.g., nanoseconds, milliseconds, seconds, minutes) elapsing, APU 200 completing a visibility pass, or both. For example, in response to completing a visibility pass, APU 200 is configured to flush compressed visibility data 360 from a bin buffer 364 into memory 106.

In embodiments, compressed visibility data 360 flushed from bin buffers 364 into memory 106 is available as compressed index data 372. That is to say, assembler 354, geometry engine 352, or both are configured to use compressed index data 372 to render one or more primitives of an image. Compressed index data 372 includes, for example, data representing vertices of one or more primitives of an image to be rendered by APU 200. In embodiments, APU 200 is configured to render an image according to an ordering of one or more bins and the respective visibility data 360 associated with tiles. For example, APU 200 is configured to render primitives of visible draw calls (e.g., draw calls having primitives that are visible in a bin) based on visibility data 360 (e.g., based on compressed index data 372 after visibility data 360 is flushed from a bin buffer 364). In response to rendering each primitive in a visible draw call in the first bin (e.g., after rendering each visible primitive in the first bin), APU 200 is configured to render the primitives of a visible draw call in a next bin (e.g., an adjacent bin) of the image. According to embodiments, APU 200 is configured to perform tile-based rendering (e.g., the frontend of graphics pipeline 224) for the primitives in a first bin currently with performing pixel-based rendering (e.g., the backend of graphics pipeline 224) for primitives in a second, different bin. For example, APU 200 concurrently performs tile-based rendering for primitives in a first bin and pixel-based rendering for primitives in a second bin where tile-based rendering has already been completed. By concurrently performing tile-based rendering and pixel-based rendering for primitives of different bins, the time needed to render an image is reduced.

To help reduce the amount of time needed for pixel engine 370 to implement instructions from the back end of graphics pipeline 224, depth engine 374 is configured to generate hierarchical depth data 378 (e.g., depth data for one or more primitives at a tile level of the image) concurrently with the visibility pass performed by binner 358. Depth engine 374 further stores the generated hierarchical depth data 378 in one or more depth buffers 376 where the hierarchical depth data 378 is made available to pixel engine 370 to, for example, perform z-culling (e.g., depth culling). In generating hierarchical depth data 378, depth engine 374 first determines one or more primitives from a command stream received, for example, from an application 110. For a first primitive (e.g., first identified primitive) of the primitives indicated in the command stream, depth engine 374 generates a bounding box for the primitive. For example, depth engine 374 determines a bottom left-most point of the primitive (e.g., minimum x, minimum y point) and a top right-most point of the primitive (e.g., maximum x, maximum y point). From the bottom left-most point and top right-most point, depth engine 374 generates a bounding box for the primitive. According to embodiments, to help account for uncertainty in the area of the primitive, depth engine 374 is configured to round the bounding box. To round the bounding box, depth engine 374 is configured, for example, to round the determined bottom left-most point to a next highest tile boundary (e.g., next highest x tile boundary and next highest y tile boundary) and to round the determined top right-most point to a next lowest tile boundary (e.g., next lowest x tile boundary, next lowest y tile boundary).

After generating the bounding box, rounding the bounding box, or both, depth engine 374 is configured to cut each tile of the image not within the boundary box, the rounded boundary box, or both from the hierarchical depth determination. After cutting these tiles, depth engine 374 determines whether each tile within the boundary box, rounded boundary box, or both, is substantially covered by the primitive. That is to say, for each tile within the boundary box where the primitive is visible (e.g., present), depth engine 374 determines whether the primitive only partially covers the tile (e.g., the primitive is present or visible in less than a predetermined threshold percentage of the tile) or substantially covers the tile (e.g., the primitive is present or visible in at least a predetermined threshold percentage of the tile). In response to determining that the primitive only partially covers a tile, depth engine 374 rejects the hierarchical depth data 378 of that tile (e.g., the depth data of the primitive in that tile) and, as such, does not pass the hierarchical depth data 378 of that tile on to one or more depth buffers 376. In response to determining that the primitive substantially covers a tile, depth engine 374 passes the hierarchical depth data 378 of that tile (e.g., the depth data of that primitive in that tile) on to one or more depth buffers 376 where it is made available to pixel engine 370. In embodiments, the hierarchical depth data 378 includes, for example, a flag indicating the primitive is valid in the tile, the depth of the primitive at one or more pixels of the tile, an average depth of the primitive in the tile, or any combination thereof.

Figure 4:
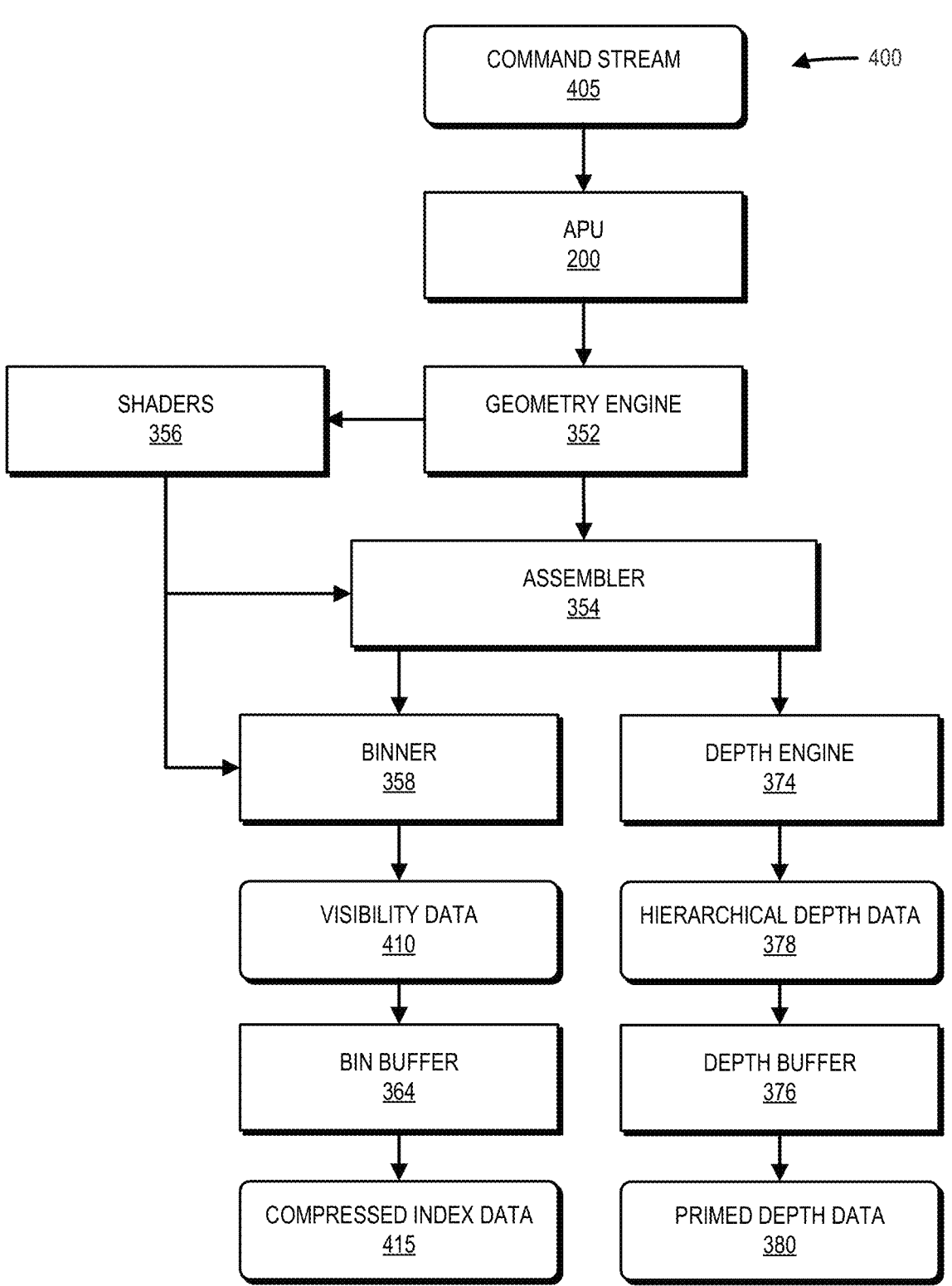
FIG. 4 is a flow diagram of an example operation for priming a depth buffer using hierarchical depth data, in accordance with some embodiments.

Referring now to FIG. 4, an example operation 400 for priming a depth buffer using hierarchical depth data is presented. In embodiments, operation 400 includes APU 200 receiving a command stream 405. Command stream 405 includes, for example, data generated by an application 110 indicating one or more primitives to be rendered for textures, images, or both. In response to receiving command stream 405, APU 200 (e.g., assembler 354) is configured to read and organize primitive data indicated in command stream 405 into one or more primitives to be rendered by one or more stages of graphics pipeline 224. After reading and organizing the primitive data indicated in command stream 405, geometry engine 352 begins rendering one or more primitives to be rendered indicated in command stream 405. For example, geometry engine 352 performs one or more instructions from one or more stages associated with the frontend of graphics pipeline 224 (e.g., vertex shader stage 228, hull shader stage 230, tessellator stage 232, domain shader stage 234, geometry shader stage 236). To perform one or more instructions from one or more stages associated with the frontend of graphics pipeline 224, geometry engine 352 is configured to use shaders 356. The operation 400 further includes proving the data generated from geometry engine 352, shaders 356, or both performing one or more instructions from one or more stages associated with the frontend of graphics pipeline 224, to assembler 354, binner 358, depth engine 374, or any combination thereof. For example, the operation 400 includes geometry engine 352, shaders 356, or both providing data generated from performing one or more instructions of geometry shader stage 236 to binner 358 and depth engine 374. In embodiments, in response to assembler 354 receiving the data generated from geometry engine 352, shaders 356, or both performing one or more instructions from one or more stages associated with the frontend of graphics pipeline 224, assembler 354 organizes the data such that it is usable by binner 358, depth engine

374, or both. For example, assembler 354 organizes the data into one or more primitives. As another example, the operation 400 includes geometry engine 352, shaders 356, or both providing data generated from performing one or more instructions of the frontend of graphics pipeline 224 to binner 358. Binner 358 uses such data, for example, to perform a visibility pass for generating visibility data for two or more bins of an image.

In response to receiving one or more primitives from geometry engine 352, assembler 354, or both, binner 358 is configured to divide the image to be rendered into two or more bin and to perform a visibility pass to generate visibility data for each bin of the image. In performing the visibility pass, operation 400 includes binner 358 generating visibility data 410, similar to or the same as visibility data 360, for each bin of an image based on each primitive provided by geometry engine 352, assembler 354, or both. For example, for a first bin, binner 358 determines if each provided primitive provided is visible (e.g., present) in the first bin. In response to no primitives associated with the same draw call not being visible (e.g., present) in the first bin binner 358 generates visibility data 410 that includes data (e.g., a flag) indicating that the draw call is not visible in the first bin and the draw call, the primitives of the draw call, or both are not to be rendered for the first bin. Such data is stored, for example, in a respective bin buffer 364 (e.g., a bin buffer associated with the first tile). In response to a primitive being visible (e.g., present) in the first tile, binner 358 generates visibility data 410 that includes data indicating the primitive is visible in the bin (e.g., a flag), the draw call associated with the primitive is visible in the bin, or both and data indicating draw call data (e.g., draw call identifier, number of primitives in the draw call), vertex data, shading data, positioning data, or any combination thereof, associated with the primitive. Such data is also stored, for example, in a respective bin buffer 364. According to embodiments, APU 200 is configured to compress visibility data 410 before it is stored in a bin buffer 364. In embodiments, operation 400 includes APU 200, CPU 102, or both flushing visibility data 410 from a primitive bin buffer 364 to memory 106. For example, in response to a threshold event (e.g., a predetermined period of time elapsing, binner 358 completing a visibility pass, or both) APU 200 is configured to flush visibility data 410 in a buffer to memory 106. After compressed visibility data 410 is flushed from a bin buffer 364 to memory 106, APU 200, geometry engine 352, or both are configured to render one or more primitives indicated in command stream 405 based on the flushed visibility data 410. For example, in response to the flushed visibility data 410 indicating a draw call indicated in command stream 405 is not visible in a first tile, APU 200, geometry engine 352, or both skip rendering of the primitives associated with the draw call in the first bin. In response to visibility data 410 indicating a primitive indicated in command stream 405 is visible in the first bin, APU 200, geometry engine 352, CPU 102, or any combination thereof renders the primitive using the flushed visibility data 410 as compressed index data 415 that includes compressed data indicating the draw call data, vertex data, shading data, positioning data, or any combination thereof, associated with the primitive. In this way, APU 200 uses compressed index data 415 to render the primitives of command stream 405 which improves rendering times.

Additionally, in response to depth engine 374 receiving one or more primitives from geometry engine 352, assembler 354, or both, operation 400 includes depth engine 374 determining hierarchical depth data 378 for the primitives received from geometry engine 352 or assembler 354, indicated in command stream 405, or both concurrently with binner 358 determining visibility data 410 for one or more tiles. To determine hierarchical depth data 378, depth engine 374 divides the image to be rendered into two or more tiles with each tile including a number of pixels in a first (e.g., horizontal) direction and a second number of pixels a second (e.g., vertical) direction. As an example, depth engine 374 divides an image into tiles each having eight pixels in a horizontal direction and eight pixels in a vertical direction. In embodiments, each bin generated by binner 358 includes a first number of tiles in a first direction and a second number of tiles in a second direction. For example, each bin includes eight tiles (e.g., 64 pixels) in a first (e.g., horizontal) direction and eight tiles (e.g., 64 pixels) in a second (e.g., vertical) direction. Once the image is divided into two or more tiles, depth engine 374 generates a bounding box for a first primitive received from the primitives received from geometry engine 352 or assembler 354, indicated in command stream 405, or both. To generate the bounding box, depth engine 374 determines a bottom left-most point of the primitive (e.g., minimum x, minimum y point) and a top right-most point of the primitive (e.g., maximum x, maximum y point). In embodiments, depth engine 374 is configured to round the determined bottom left-most point and the top right-most point of the primitive when generating the bounding box. For example, depth engine 374 rounds the bottom left-most point to a next highest tile boundary (e.g., next highest x tile boundary and next highest y tile boundary) and the top right-most point to a next lowest tile boundary (e.g., next lowest x tile boundary and next-lowest y tile boundary). After determining the bottom left-most point and the top right-most point of the primitives, rounding the bottom left-most and the top right-most points, or both, depth engine 374 is configured to generate the bounding box for the primitive. As an example, depth engine 374 is configured to generate a rectangle having a first vertex at the location of the bottom left-most point of the primitive (e.g., rounded bottom left-most point) and a second, diagonally opposite vertex at the location of the top right-most point of the primitive (e.g., rounded top right-most point). Once the bounding box is generated, depth engine 374 determines whether the bounding box is value. That is to say, depth engine 374 determines if the bounding box has an area greater than zero (e.g., a valid bounding box) or an area less than or equal to zero (e.g., an invalid bounding box). In response to the generated bounding box being invalid, depth engine 374 culls the primitive from the hierarchical depth data 378 determination and moves to determine hierarchical depth data 378 for a next primitive from the primitives received from geometry engine 352 or assembler 354, indicated in command stream 405, or both.

In response to a bounding box being valid, depth engine 374 is then configured to cut each tile of the image not within the bounding box from the hierarchical depth data 378 determination. That is to say, depth engine 374 does not consider the tiles of the image outside of the boundary box when determining hierarchical depth data 378. For each tile within the boundary box, depth engine 374 determines whether or not the primitive substantially covers the tile. For example, for each tile within the boundary box where the primitive is visible (e.g., present), depth engine 374 determines whether the primitive substantially covers the tile (e.g., the primitive is visible in at least a predetermined threshold percentage of the tile) or only partially covers the tile (e.g., the primitive is visible in less than a predetermined threshold percentage of the tile). In some embodiments, depth engine 374 is configured to determine if a primitive is visible in a tile while in other embodiments, binner 358 is configured to determine if a primitive is visible in a tile (e.g., as during a visibility pass). In response to the primitive only partially covering the tile, depth engine 374 rejects the depth data from that tile and, as such, does not pass that data to one or more depth buffers 376. In response to the primitive substantially covering the tile, depth engine 374 is configured to pass the depth data of that tile as hierarchical depth data 378 to one or more depth buffers 376. That is to say, depth engine 374 passes the depth data of the primitive within that tile (e.g., hierarchical depth data 378) to one or more depth buffers 376. Once hierarchical depth data 378 is stored in one or more depth buffers 376, the hierarchical depth data 378 is made available as primed depth data 380 for pixel engine 370 to render one or more primitives at a pixel level. In this way, the time needed to perform pixel-based rendering for one or more primitives is reduced.

Figures 5, 6:
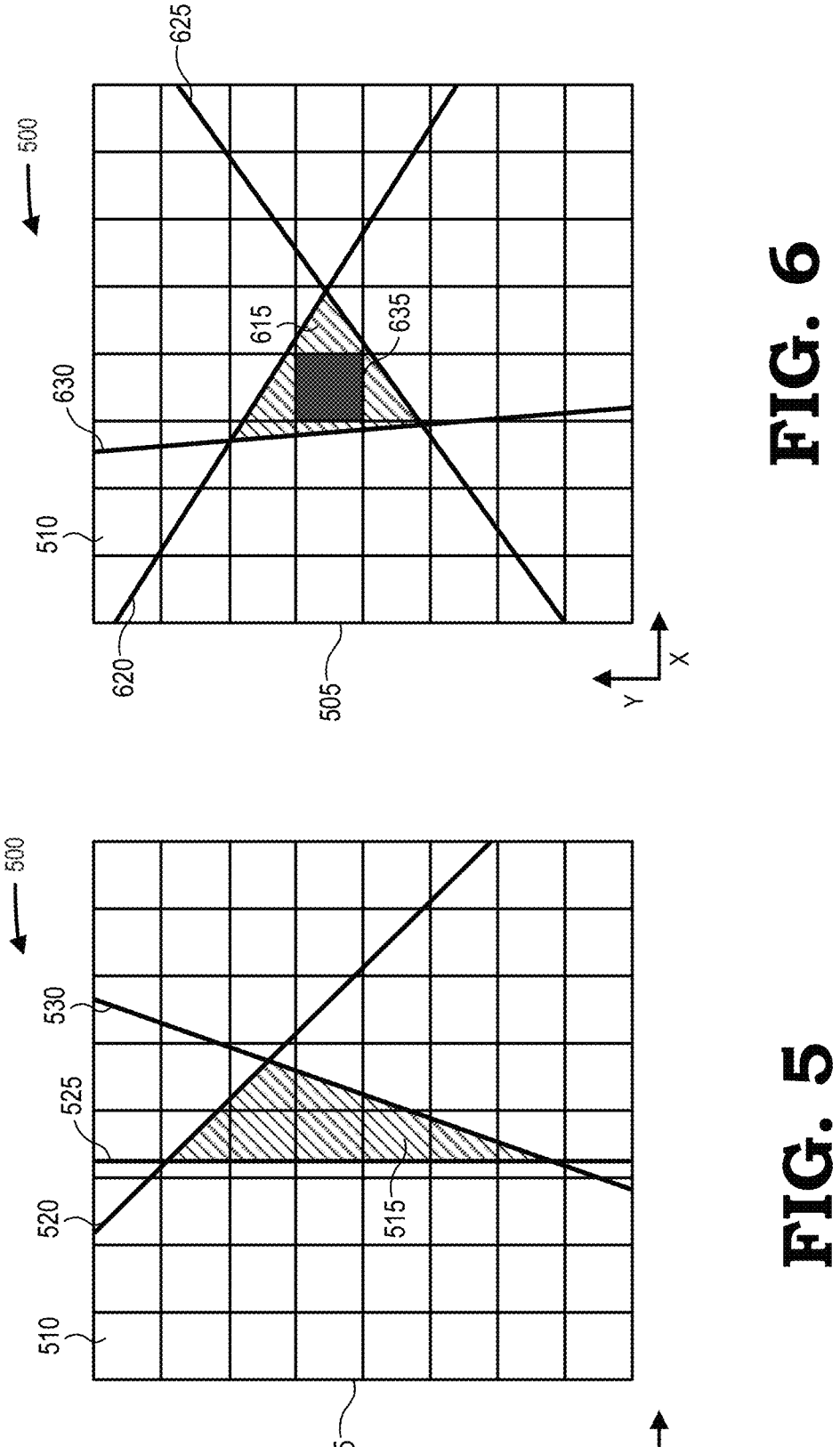
FIGS. 5-7, each presents a diagram of an example primitive at least partially covering one or more tiles of an image used to generate hierarchical depth data, in accordance with some embodiments.
Figure 7:
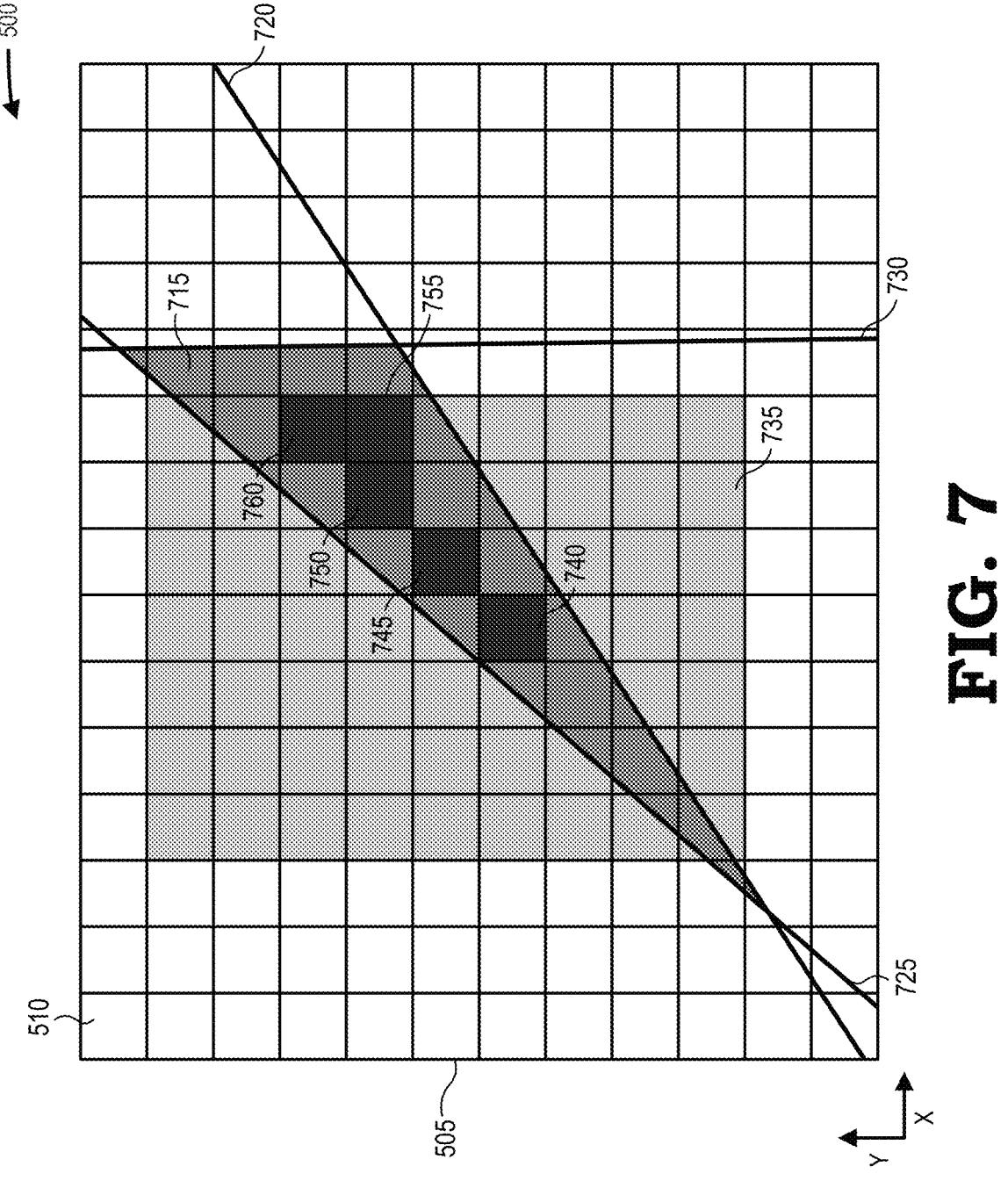

Referring now to FIGS. 5-7, example diagrams 500 of primitives covering one or more tiles of an image used to generate hierarchical depth data are presented. Each of FIGS. 5-7 refers to an image 505 divided into one or more tiles 510. For example, FIGS. 5 and 6 refer to an image 505 divided into at least eight tiles in an x-direction and at least eight tiles in a y-direction, and FIG. 7 refers to an image 505 divided into at least 15 tiles in an x-direction and at least 12 tiles in a y-direction. Referring now to the diagram 500 presented in FIG. 5, a primitive 515 (e.g., illustrated by shading) defined by lines 520, 525, and 530 of image 505 is illustrated. In embodiments, to generate hierarchical depth data, similar to or the same as hierarchical depth data 378, a depth engine, similar to or the same as depth engine 374, first determines a boundary box for primitive 515. For example, the depth engine first determines a bottom left-most point of primitive 515 (e.g., the intersection of lines 525, 53) and a top right-most point of primitive 515 (e.g., the intersection of lines 520, 530). The depth engine then rounds the bottom left-most point to a next highest tile boundary (e.g., the next highest tile boundary in the x-direction and the next highest tile boundary in the y-direction) and the top right-most point to a next lowest tile boundary (e.g., the next lowest tile boundary in the x-direction and the next lowest tile boundary in the y-direction). After rounding the bottom left-most and top right-most point, the depth engine generates the bounding box based on the rounded bottom-left most and top right-most points. For example, the depth engine generates a rectangular bounding box having a first vertex at a location of the rounded bottom left-most point and a second, opposite vertex at a location of the rounded top right-most point. The depth engine then determines if the generated bounding box is invalid. For example, the depth engine determines if the generated bounding box has an area equal to or less than zero. For example, based on the rounded bottom left-most and top right-most points of primitive 515, a boundary box has an invalid boundary box (e.g., a boundary box having an area of zero). In response to a bounding box being invalid, the depth engine culls that primitive from the hierarchical depth data determination. For example, referring to the example embodiment in FIG. 5, in response to the bounding box of primitive 515 being invalid, the depth engine would cull primitive 515 from the hierarchical depth data determination.

Referring now to diagram 500 presented in FIG. 6, a primitive 615 (e.g., illustrated by shading) defined by lines 620, 625, and 630 of image 505 is illustrated. In embodiments, to generate hierarchical depth data for primitive 615, the depth engine first determines a boundary box for primitive 515. For example, the depth engine first determines a bottom left-most point of primitive 615 (e.g., the intersection of lines 625, 630) and a top right-most point of primitive 615 (e.g., the intersection of lines 620, 625). The depth engine then rounds the bottom left-most point to a next highest tile boundary (e.g., the next highest tile boundary in the x-direction and the next highest tile boundary in the y-direction) and the top right-most point to a next lowest tile boundary (e.g., the next lowest tile boundary in the x-direction and the next lowest tile boundary in the y-direction). After rounding the bottom left-most and top right-most points, the depth engine generates the bounding box based on the rounded bottom-left most and top right-most points. For example, referring to the example embodiment presented in FIG. 6, after rounding the bottom left-most and top right-most points the depth engine generates the bounding box 635 (e.g., illustrated by darker shading), covering, for example, one tile 510 of image 505. In response to determining bounding box 635, the depth engine cuts each tile 510 of image 505 not within bounding box 635 from consideration for the hierarchical depth data determination. For example, referring to the example embodiment presented in FIG. 6, the depth engine cuts all but one tile (e.g., all but the tile covered by bounding box 635) from consideration for the hierarchical depth data determination. Next, the depth engine determines if the tiles within bounding box 635 are substantially covered by primitive 615. In response to a tile being substantially covered by primitive 615 (e.g., primitive 615 is visible in at least a predetermined threshold percentage of the tile), hierarchical depth data (e.g., depth data at a tile level) for primitive 615 in that tile is passed on to a depth buffer, similar to or the same as depth buffers 376. For example, in the example embodiment presented in FIG. 6, the one tile within bounding box 635 is substantially (e.g., completely) covered by primitive 615. As such, the depth engine passes the depth data for primitive 615 in the tile to a depth buffer as hierarchical depth data (e.g., depth data of primitive 615 at a tile level).

Referring now to diagram 500 presented in FIG. 7, a primitive 715 (e.g., illustrated by medium shading) defined by lines 720, 725, and 730 of image 505 is illustrated. In embodiments, to generate hierarchical depth data for primitive 715, the depth engine first determines a boundary box for primitive 715. For example, the depth engine first determines a bottom left-most point of primitive 715 (e.g., the intersection of lines 720, 725) and a top right-most point of primitive 715 (e.g., the intersection of lines 725, 730). The depth engine then rounds the bottom left-most point to a next highest tile boundary (e.g., the next highest tile boundary in the x-direction and the next highest tile boundary in the y-direction) and the top right-most point to a next lowest tile boundary (e.g., the next lowest tile boundary in the x-direction and the next lowest tile boundary in the y-direction) and generates the bounding box. For example, referring to the example embodiment presented in FIG. 7, after rounding the bottom left-most and top right-most points the depth engine generates the bounding box 735 (e.g., illustrated by lighter shading), covering, for example, 63 tiles 510 of image 505. In response to determining bounding box 735, the depth engine cuts each tile 510 of image 505 not within bounding box 735 from consideration of the hierarchical depth data determination. For example, referring to the example embodiment presented in FIG. 7 the depth engine cuts all but the 63 tiles within bounding box 735 from consideration for the hierarchical depth data determination. Next, the depth engine determines if the tiles within bounding box are substantially covered by primitive 715 or not. For example, for each tile 510 within bounding box 735 where primitive 715 is visible, the depth engine determines whether primitive 715 covers at least a predetermined threshold percentage of the tile (e.g., primitive 715 is visible in the entirety of the tile) or only partially covers the tile (e.g., primitive 715 is visible in less than a predetermined threshold percentage of the tile). In response to a tile 510 only being partially covered by primitive 715, the depth engine rejects depth data from that tile 510 and, therefore, does not pass the depth data on to a depth buffer. In response to a tile being substantially covered by primitive 715, the depth engine passes the hierarchical depth data (e.g., depth data at a tile level) for primitive 715 in that tile 510 to a depth buffer. For example, in the example embodiment presented in FIG. 7, the depth engine passes depth data from the five tiles (740, 745, 750, 755, 760) substantially (e.g., completely) covered by primitive 715 to a depth buffer as hierarchical depth data and rejects depth data from the remaining tiles only partially covered by primitive 715.

Figure 8:
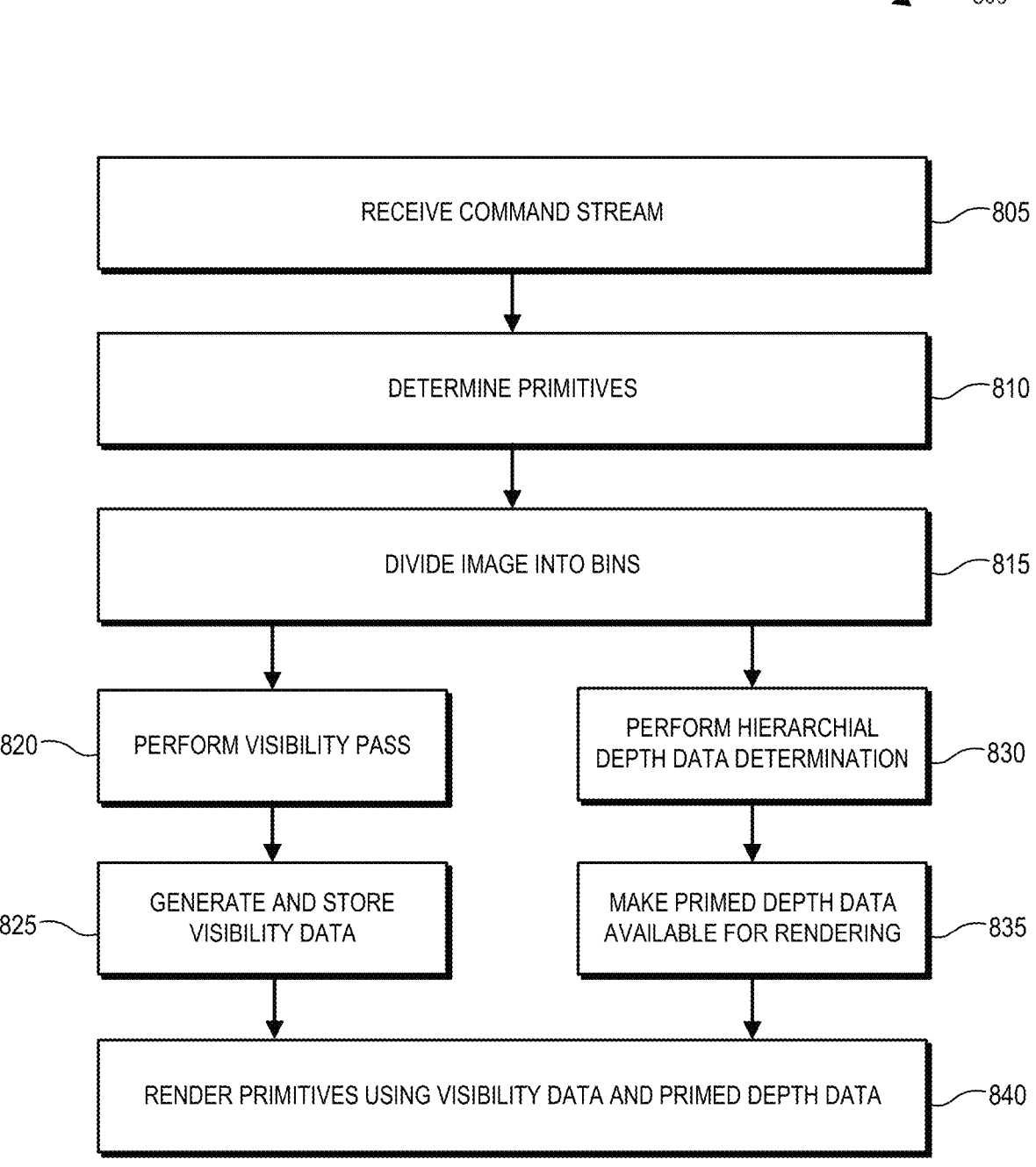
FIG. 8 is a flow diagram of an example method for rendering one or more primitives using visibility and hierarchical depth data, in accordance with some embodiments.

Referring now to FIG. 8, a flow diagram of an example method 800 for rendering one or more primitives using visibility and hierarchical depth data is presented. At step 805, an APU, similar to or the same as APU 114, 200, receives a command stream, similar to or the same as command stream 405, indicating a batch of draw calls identifying one or more primitives to be rendered for one or more textures, images, or both. For example, the APU receives a command stream from an application 110 indicating one or more primitives to be rendered for one or more textures, images, or both. At step 810, the APU performs one or more operations to at least partially render the primitives indicated in the command stream. For example, the APU performs one or more instructions from one or more stages (e.g., assembler stage, vertex shader stage, hull shader stage, tessellator stage, domain shader stage, geometry shader stage) of the frontend of a graphics pipeline, similar to or the same as graphics pipeline 224 to at least partially render the primitives indicated in the command stream. At step 815, the APU divides the image into two or more bins (e.g., coarse bins) each including a number of pixels in a first direction (e.g., horizontal) and second number of pixels in a second direction (e.g., vertical). At step 820 the APU performs a visibility pass for the image to generate visibility data for each bin of the image by determining which of the primitives indicated in the command stream are visible (e.g., present) in which bins. At step 825, based on the visibility pass, the APU generates visibility data, similar to or the same as visibility data 360, 410, for each bin. For example, for each bin, APU determines whether each draw call, primitive, or both are visible in the bin. In response to no primitives of a draw call being visible in a bin, the APU generates visibility data (e.g., a flag) indicating that the draw call is not visible in the bin and the primitives of the draw call are not to be rendered for that bin. In response to a primitive being visible in the bin, the APU determines visibility data (e.g., a flag) indicating the primitive is visible in the bin and data indicating draw call, vertex, shading, and positioning data associated with the primitive in the bin. After determining visibility data for primitives in a bin, the APU compresses and stores the determined visibility data in a primitive bin buffer, similar to or the same as bin buffers 364, associated with the bin.

In embodiments, at step 830, the APU performs hierarchical depth data determinations for the primitives indicated in the command stream. To determine hierarchical depth data, similar to or the same as hierarchical depth data 378, for a primitive, the APU first generates a bounding box for the primitive by determining a bottom left-most point and top right-most point of the primitive. The APU then rounds the bottom left-most point to a next highest tile boundary and top right-most point to a next lowest tile boundary and uses the rounded points to generate a bounding box. In response to generating the bounding box, the APU cuts each tile of the image from the hierarchical depth data determination. For each tile within the bounding box where the primitive is visible (e.g., present), the APU determines whether or not the primitive substantially covers the tile. That is to say, the APU determines whether the primitive covers at least a predetermined threshold percentage the tile (e.g., the primitive is visible in the entirety of the tile) or only partially covers the tile (e.g., the primitive is visible in less than a predetermined threshold percentage of the tile). In response to the primitive only partially covering the tile, the APU rejects the depth data of the primitive in that tile and does not pass it on to a depth buffer similar to or the same as depth buffer 376. In response to the primitive substantially covering the tile, the APU passes the depth data of the primitive in that tile as hierarchical depth data (e.g., depth data at a tile level) to the depth buffer. At step 835, the depth buffer makes the hierarchical depth data available as primed depth data, similar to or the same as primed depth data 380, for rendering one or more primitives. In embodiments, APU performs step 830, step 835, or both concurrently with step 820, step 825, or both.

At step 840, the APU, a CPU, similar to or the same as CPU 102, or both are configured to flush one or more primitive bin buffers storing compressed visibility data into memory 106. For example, the APU, CPU, or both are configured to flush a primitive bin buffer in response to the completion of a visibility pass, after a predetermined amount of time has elapsed, or both. In embodiments, the APU, CPU, or both flush the compressed visibility data into memory 106 such that the flushed visible data is available as compressed index data, similar to or the same as compressed index data 372, 415. According to embodiments, the APU, CPU, or both are configured to render one or more primitives indicated in the command stream using the compressed index data. For example, the APU is configured to perform at least a portion of the frontend of graphics pipeline 224 (e.g., tile-based rendering) using the compressed index data to render the primitives indicated in the command stream. Additionally, at step 840, the APU, CPU, or both perform at least a portion of the backend of graphics pipeline (e.g., pixel-based rendering) using the primed depth data available in one or more depth buffers. For example, in response to the APU rendering at least a portion of a primitive by performing at least a portion of the frontend of graphics pipeline 224 (e.g., tile-based rendering), the APU is configured to render the primitive by using primed depth data to perform at least a portion of the backend of graphics pipeline 224 (e.g., pixel-based rendering). By using the primed depth data, the time to render the primitive is reduced, improving the efficiency of the system.

Figure 9:
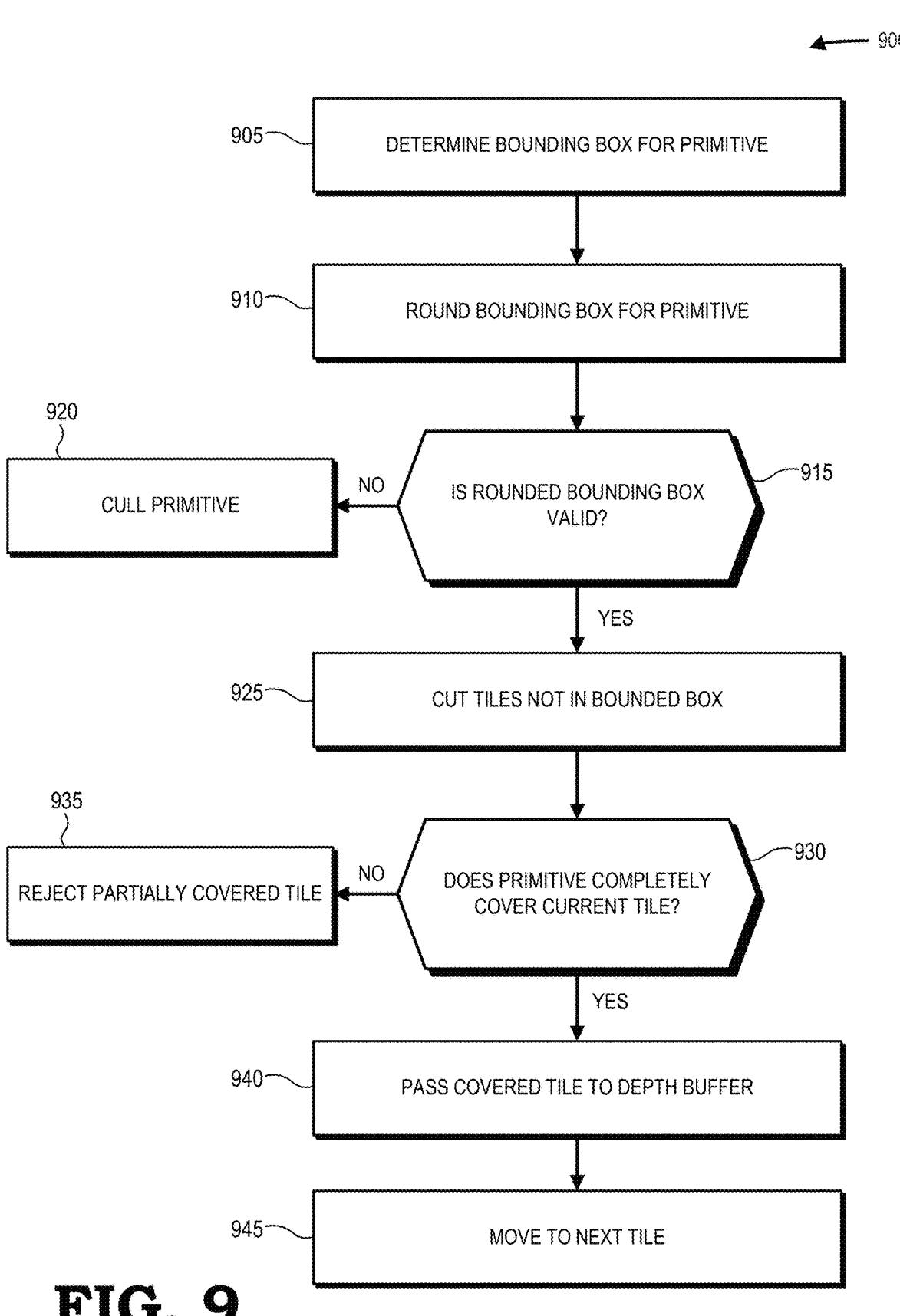
FIG. 9 is a flow diagram of an example method for generating hierarchical depth data to prime a depth buffer, in accordance with some embodiments.

Referring now to FIG. 9, an example method 900 for generating hierarchical depth data to prime a depth buffer is presented. At step 905, an APU, similar to or the same as APU 114, 200, determines one or more primitives to be rendered for an image divided into two or more tiles. The APU determines the primitives to be rendered from, for example, a command stream similar to or the same as command stream 405. For a first primitive of the primitives indicated in the command stream, the APU determines a bounding box for the primitive. The APU determines the bounding box by, for example, determining a bottom left-most point (e.g., minimum x, minimum y point) of the primitive and a top right-most point (e.g., maximum x, maximum y point) of the primitive. In embodiments, the APU then generates the bounding box by generating a rectangular bounding box having a first vertex at a location of the bottom left-most point of the primitive and a second, diagonally opposite vertex at a location of the top right-most point of the primitive. At step 910, the APU rounds the bounding box. For example, the APU rounds the bottom left-most point of the primitive (e.g., the first vertex of the bounding box) to a next highest tile boundary (e.g., next highest x tile boundary, next highest y tile boundary) and rounds to top right-most point of the primitive (e.g., the second, diagonally opposite vertex of the bounding box) to a next lowest tile boundary (e.g., next lowest x tile boundary, next lowest y tile boundary).

At step 915, the APU determines whether the rounded bounding box is valid. For example, the APU determines if the rounded bounding is valid by determining if the bounding box has an area greater than zero. In response to the bounding box being invalid (e.g., having an area less than or equal to zero), the system 100 moves to step 920 and the primitive is culled from the hierarchical depth data determination of the method 900. In response to the bounding box being valid (e.g., having an area greater than zero), the system 100 moves to step 925. At step 925, the APU cuts the tiles of the image not within the rounded bounding box from the hierarchical depth data determination of the method 900. At step 930, the APU determines whether each tile within the bounding box is substantially covered by the primitive. For example, for each tile within the bounding box where the primitive is visible (e.g., present), the APU determines whether the primitive substantially covers the tile (e.g., the primitive is visible in at least a predetermined threshold percentage of the tile) or only partially covers the tile (e.g., the primitive is visible in less than a predetermined threshold percentage of the tile). In response to the primitive only partially covering a tile within the rounded bounding box, the system 100 moves to step 935. At step 935, the APU rejects the depth data of the primitive in that tile and the depth data is not passed onto a depth buffer, similar to or the same as depth buffers 376. In response to the primitive substantially covering the tile, the system 100 moves on to step 940. At step 940, the depth engine passes the depth data of the primitive in that tile to the depth buffer as hierarchical depth data. That is to say, the depth engine passes data representing the depth of the primitive at a tile level (e.g., hierarchical depth data) to the depth buffer. At step 945, the system 100 moves on to a next tile indicated in the command stream and repeats step 905 with the next tile.

In some embodiments, the apparatus and techniques described above are implemented in a system including one or more integrated circuit (IC) devices (also referred to as integrated circuit packages or microchips), such as the operation to generate hierarchical depth data to prime a depth buffer described above with reference to FIGS. 1-9. Electronic design automation (EDA) and computer aided design (CAD) software tools may be used in the design and fabrication of these IC devices. These design tools typically are represented as one or more software programs. The one or more software programs include code executable by a computer system to manipulate the computer system to operate on code representative of circuitry of one or more IC devices so as to perform at least a portion of a process to design or adapt a manufacturing system to fabricate the circuitry. This code can include instructions, data, or a combination of instructions and data. The software instructions representing a design tool or fabrication tool typically are stored in a computer readable storage medium accessible to the computing system. Likewise, the code representative of one or more phases of the design or fabrication of an IC device may be stored in and accessed from the same computer readable storage medium or a different computer readable storage medium.

A computer readable storage medium may include any non-transitory storage medium, or combination of non-transitory storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory) or coupled to the computer system via a wired or wireless network (e.g., network accessible storage (NAS)).

In some embodiments, certain aspects of the techniques described above may implemented by one or more processors of a processing system executing software. The software includes one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method comprising:
for each primitive of a plurality of primitives of an image to be rendered:
in response to a predetermined threshold percentage of a first tile of the image being covered by the primitive, passing depth data of the primitive in the first tile to a depth buffer; and
in response to the predetermined threshold percentage of the first tile not being covered by the primitive, rejecting the depth data of the primitive in the first tile such that the depth data of the primitive in the first tile is not passed to the depth buffer; and
rendering the primitive based on the depth data in the depth buffer.

2. The method of claim 1, further comprising, for each primitive of the plurality of primitives:
generating a bounding box for the primitive; and
cutting each tile of the image not within the bounding box, wherein the first tile is within the bounding box.

3. The method of claim 2, further comprising, for each primitive of the plurality of primitives:
rounding the bounding box.

4. The method of claim 2, further comprising, for each primitive of the plurality of primitives:
in response to the bounding box being invalid, culling the primitive.

5. The method of claim 1, further comprising, for one or more primitives of the plurality of primitives:
in response to passing depth data of the primitive in the first tile to the depth buffer, determining whether a predetermined threshold percentage of a second tile of the image is covered by the primitive.

6. The method of claim 1, further comprising:
performing a visibility pass for one or more coarse bins of the image concurrently with determining, for one or more primitives of the plurality of primitives, whether the predetermined threshold percentage of the first tile of the image is covered by the primitive.

7. A method comprising:
for each primitive of a plurality of primitives of an image to be rendered, generating a bounding box for the primitive;
for each tile of a plurality of tiles of the image within the bounding box:
in response to determining a predetermined threshold percentage of the tile being covered by the primitive, passing depth data of the primitive in the tile to a depth buffer used to render the primitive; and
in response to the predetermined threshold percentage of the tile not being covered by the primitive, rejecting the depth data of the primitive in the tile such that the depth data is not passed to the depth buffer.

8. The method of claim 7, further comprising, for each primitive of the plurality of primitives:

rounding the bounding box; and
cutting each tile of the image not within the bounding box.

9. The method of claim 7, further comprising, for each primitive of the plurality of primitives:
in response to the bounding box being invalid, culling the primitive.

10. The method of claim 7, further comprising:
performing a visibility pass for the image concurrently with determining whether a predetermined threshold percentage of one or more tiles of the image are covered by one or more primitives of the plurality of primitives.

11. The method of claim 10, further comprising:
generating visibility data for a bin based on the visibility pass; and
rendering the plurality of primitives based on the visibility data and the depth data stored in the depth buffer.

12. An accelerated processing unit, comprising:
a plurality of processor cores including circuitry configured to:
for each primitive of a plurality of primitives of an image to be rendered:
in response to a predetermined threshold percentage of a tile of the image being covered by the primitive, pass depth data of the primitive in the tile to a depth buffer; and
in response to the predetermined threshold percentage of the tile not being covered by the primitive, reject the depth data of the primitive in the tile such that the depth data of the primitives in the tile is not passed to the depth buffer; and
render the primitive based on the depth data in the depth buffer.

13. The accelerated processing unit of claim 12, wherein the plurality of processor cores includes circuitry configured to, for each primitive of the plurality of primitives:
generate a bounding box for the primitive; and
trim each tile of the image not within the bounding box, wherein the tile is within the bounding box.

14. The accelerated processing unit of claim 13, wherein the plurality of processor cores includes circuitry configured to, for each primitive of the plurality of primitives:
round the bounding box.

15. The accelerated processing unit of claim 14, wherein the plurality of processor cores includes circuitry configured to, for each primitive of the plurality of primitives:
in response to the bounding box being invalid, cull the primitive.

16. The accelerated processing unit of claim 12, wherein the plurality of processor cores includes circuitry configured to, for one or more primitives of the plurality of primitives:
in response to passing depth data of the primitive in the tile to the depth buffer, determine whether a predetermined threshold percentage of a second tile of the image is covered by the primitive of the image.

17. The accelerated processing unit of claim 12, wherein the plurality of processor cores includes circuitry configured to:
perform a visibility pass for one or more bins of the image concurrently with determining whether the predetermined threshold percentage of the tile of the image is covered by one or more primitives of plurality of primitives.

* * * * *